United States Patent [19]

Hollenbaugh, Jr. et al.

[11] Patent Number: 5,364,699
[45] Date of Patent: Nov. 15, 1994

[54] CONTINUOUS POLYTETRAFLOROETHYLENE FIBERS

[75] Inventors: Donald L. Hollenbaugh, Jr., Northeast, Md.; Gordon L. McGregor, Landenberg, Pa.; Raymond B. Minor, Elkton, Md.

[73] Assignee: W. L. Gore & Associates, Inc., Newark, Del.

[21] Appl. No.: 187,442

[22] Filed: Jan. 25, 1994

Related U.S. Application Data

[62] Division of Ser. No. 778,294, Oct. 17, 1991, Pat. No. 5,281,475, and a division of Ser. No. 1,869, Jan. 8, 1993, Pat. No. 5,288,552, which is a division of Ser. No. 778,294, Oct. 17, 1991, Pat. No. 5,281,475.

[51] Int. Cl.$^5$ .............................................. D02G 3/00
[52] U.S. Cl. ..................................... 428/357; 428/364; 428/370; 428/371; 428/377; 57/907
[58] Field of Search .............. 428/370, 371, 357, 422, 428/364, 377, 375; 57/907; 156/184

[56] References Cited

U.S. PATENT DOCUMENTS

| | | |
|---|---|---|
| 1,223,933 | 4/1917 | Carr ........................ 239/33 |
| 2,072,580 | 3/1937 | Correl ........................ 239/33 |
| 2,363,457 | 5/1942 | Alderfer . |
| 2,664,374 | 12/1953 | Slayter et al. . |
| 2,685,707 | 12/1954 | Llewellyn et al. . |
| 2,722,444 | 12/1956 | Burrows . |
| 3,101,855 | 8/1963 | Yuen ........................ 239/33 |
| 3,126,699 | 3/1964 | Lefevre . |
| 3,168,982 | 2/1965 | Davis ........................ 239/33 |
| 3,278,673 | 10/1966 | Gore ........................ 264/127 |
| 3,953,566 | 4/1976 | Gore . |
| 5,043,228 | 8/1991 | Nagaoka . |
| 5,067,561 | 10/1991 | Katayama . |
| 5,281,475 | 1/1994 | Hollenbaugh, Jr. ........... 428/357 |
| 5,288,552 | 2/1994 | Hollenbaugh, Jr. ........... 428/422 |

FOREIGN PATENT DOCUMENTS

| | | |
|---|---|---|
| 742534 | 9/1966 | Canada . |
| 2061084 | 6/1971 | France . |
| 2525523 | 12/1976 | Germany . |
| 1029530 | 5/1916 | United Kingdom . |

OTHER PUBLICATIONS

"Expanded PTFE Fiber and Fabric Technology for Liquid and Gas Giltration" M. E. Johnson, Journal of Industrial Fabrics, vol. 5, pp. 33–39 (Summer 1986).

Primary Examiner—Patrick J. Ryan
Assistant Examiner—N. Edwards
Attorney, Agent, or Firm—Gary A. Samuels

[57] ABSTRACT

This invention provides for a continuous PTFE fiber having on its surface a substantially round profile and a single spiralling seam formed from a continuous sheet of polytetrafluoroethylene which is helically rolled and self-adhered. The PTFE sheet may include microporous PTFE as well as expanded microporous PTFE. The PTFE sheet may be filled with particulate fillers or coated with polymeric coatings prior to the formation of the inventive fiber. The PTFE sheet may be used to contain various filamentary or sheet-like elements with the inventive fiber.

The method for producing the inventive fiber is also disclosed.

4 Claims, 4 Drawing Sheets

CONTINUOUS POLYTETRAFLOROETHYLENE FIBERS

CROSS REFERENCE TO RELATED APPLICATION

This application is a division of U.S. Ser. No. 07/778,294 filed Oct. 17, 1991, now U.S. Pat. No. 5,281,475, and a division of U.S. Ser. No. 08/001,869 filed Jan. 8, 1993, now U.S. Pat. No. 5,288,553, which is a division of U.S. Ser. No. 07/778,294 filed Oct. 17, 1991, now U.S. Pat. No. 5,281,475.

FIELD OF THE INVENTION

This invention relates to a novel continuous polytetrafluoroethylene fiber having a substantially round profile.

BACKGROUND OF THE INVENTION

Polytetrafluoroethylene (PTFE) fiber is a desirable commercial form of PTFE, however, manufacture of continuous strong fibers from PTFE resin is a difficult process. Conventional fiber forming techniques used in production of fibers from other polymeric materials are of little use in producing PTFE fibers.

Direct extrusion of a PTFE melt through spinnerets or multiple fine holes in a die is impractical due to the extremely high melt viscosity of the polymer. Similarly, a PTFE coagulated dispersion or fine powder in which an extrusion aid has been mixed also exhibits extremely high viscosity upon direct extrusion.

To overcome the difficulties of extruding high viscosity PTFE resin in a fiber form, a process was developed as taught in U.S. Pat. No. 2,772,444 to Burrows, et al. In this process, an aqueous dispersion of PTFE resin is mixed with cellulose xanthate and extruded by conventional fiber forming techniques used to make viscose fibers. The extruded PTFE/cellulose xanthate mix is subsequently heated to high temperatures so to thermally decompose the cellulose xanthate while at the same time heating the residual PTFE above its crystalline melt point thereby forming coherent PTFE fibers. The product of this process is a multiple filament fiber of low tenacity and having a brown color. The brown color can be removed and the multiple filament fiber returned to the usual white color of other unpigmented PTFE products though the use of a bleaching process; however, bleached fibers exhibit approximately 50% of the tenacity of unbleached fibers.

Later, as taught in U.S. Pat. Nos. 3,953,566, 3,962,153 and 4,187,390 all to Gore, a form of PTFE combining high strength and high porosity was made by expanding PTFE shapes. In U.S. Pat. No. 3,962,153, a PTFE fiber is produced through the rapid expansion of a shaped PTFE rod. This process is not desirable for the commercial production of fibers since fibers produced by this process are not made in continuous lengths but rather are limited by the length of the rod and the ability to expand the rod.

In U.S. Pat. Nos. 3,953,566 and 4,187,390, a continuous sheet of expanded microporous PTFE has been made by expanding PTFE in tape or sheet form. This sheet of expanded microporous PTFE is subsequently slit to form a slit film fiber in continuous length as shown in FIG. 1. Slit film fibers of expanded microporous PTFE are much stronger, with tenacities 2½ to 5 times or more than those fibers of the same denier made by the process of U.S. Pat. No. 2,772,444. Furthermore, slit film fibers of expanded microporous PTFE exhibit low shrinkage and high modulus of elasticity at elevated temperatures.

However, slit film fibers of expanded microporous PTFE have a tendency to fibrillate or fray at the slit edges of the fiber. Also slit film fibers of expanded microporous PTFE are not round but are rectangular in cross-section. Therefore, to obtain a more uniform appearance in slit film fibers of expanded microporous PTFE slit film fibers of expanded microporous PTFE are twisted along their longitudinal axis producing twisted fibers. Twisted fibers give the illusion of appearing more round in cross-section than untwisted fibers by presenting a mixture of sides of the rectangular cross-section of the fibers to the viewer which is especially desirable when slit film fibers of expanded microporous PTFE are used in the production of knitted or woven fabrics. The fibers may be twisted to the extent that tubular structures are produced. It is desirable that fibers have uniform cross-sections along their lengths so that fabrics produced from these fibers contain interstices of an uniform and predictable nature. Fabrics containing interstices of a uniform and predictable nature when used as a filter element exhibit a constant filtration efficiency across the surface of the fabric. However, slit film fibers of expanded microporous PTFE are difficult to produce with a consistent twist along the length of the fibers, thereby resulting in fibers with non-uniform cross sections along their length. Fibers having inconsistent twists, as well as fabrics produced from these fibers, are considered flawed when visually inspected, and are of limited utility as a filter element.

It is to the provision of continuous PTFE fibers with substantially round profiles that this invention is directed.

SUMMARY OF THE INVENTION

The invention is directed to a continuous PTFE fiber, i.e. a strand, thread, rod or tube comprising a helically rolled, self-adhered continuous sheet of PTFE said fiber having an outside surface with a substantially round profile and a single spiralling seam. The continuous sheet of PTFE may be filled with particulate fillers or coated with polymeric materials prior to production of the continuous substantially round PTFE fiber. The continuous sheet of PTFE may be used to combine other elements, i.e. filamentary elements or sheet-like elements, within the continuous substantially round PTFE fiber.

DETAILED DESCRIPTION OF THE INVENTION

The invention is directed to articles of manufacture which are continuous polytetrafluoroethylene (PTFE) fibers, i.e. strands, threads, rods, or tubes having an outside surface with a substantially round profile and a single spiralling seam. The fiber is produced from a continuous sheet of PTFE, preferably from a continuous sheet of microporous PTFE, more preferably from a continuous sheet of expanded microporous PTFE as taught in U.S. Pat. Nos. 3,953,566 and 4,187,390 all to Gore and incorporated herein by reference. Preferably the continuous sheet of PTFE has a width at least 10 times its thickness.

If the continuous sheet of PTFE is expanded microporous PTFE, the continuous sheet of expanded microporous PTFE may be either biaxially expanded, i.e. expanded in both longitudinal and transverse directions or uniaxially expanded in only a longitudinal direction.

Figure 1:
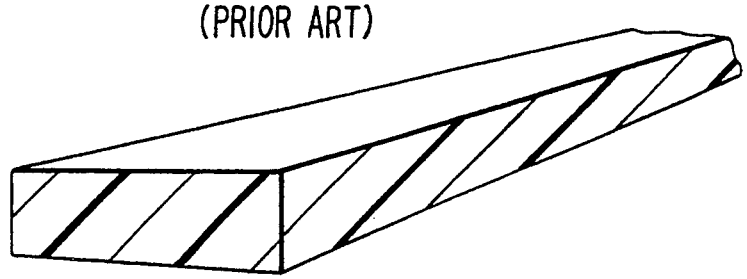
FIG. 1 depicts a prior art slit film fiber.
Figure 2:
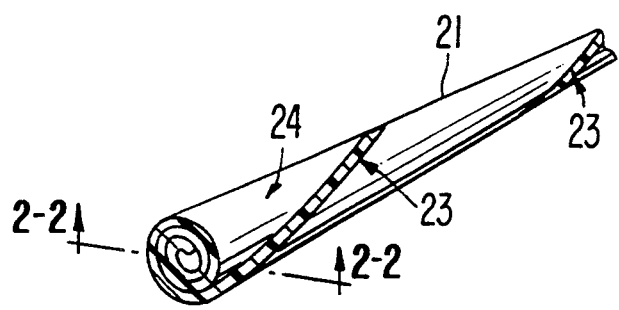
FIG. 2 depicts the inventive fiber in a perspective view.
Figure 3:
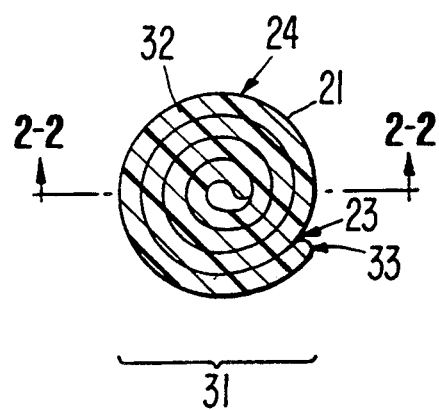
FIG. 3 depicts the inventive fiber in a cross-sectional view.

Referring to FIG. 3, a cross-sectional view of a continuous PTFE fiber 21 of the instant invention taken along orientation line 2—2 in FIG. 2 is depicted. The continuous PTFE fiber is comprised of a helically rolled self-adhered continuous sheet of PTFE 32. The continuous PTFE fiber has an outside surface 24 with a substantially round profile 31 and a single seam 23. The single seam is formed by adherence of the outside edge 33 of the helically rolled self-adhered continuous sheet of PTFE 32 to the outside surface 24 of the continuous PTFE fiber.

Referring now to FIG. 2, a perspective view of the continuous fiber 21 of the instant invention is depicted. The single seam 23 is clearly shown spiralling along the length of the continuous PTFE fiber.

"Helically rolled" is defined herein as a spiral structure formed through wrapping the continuous PTFE sheet about a central longitudinal axis of the inventive fiber in the longitudinal direction of the inventive fiber.

Figure 6:
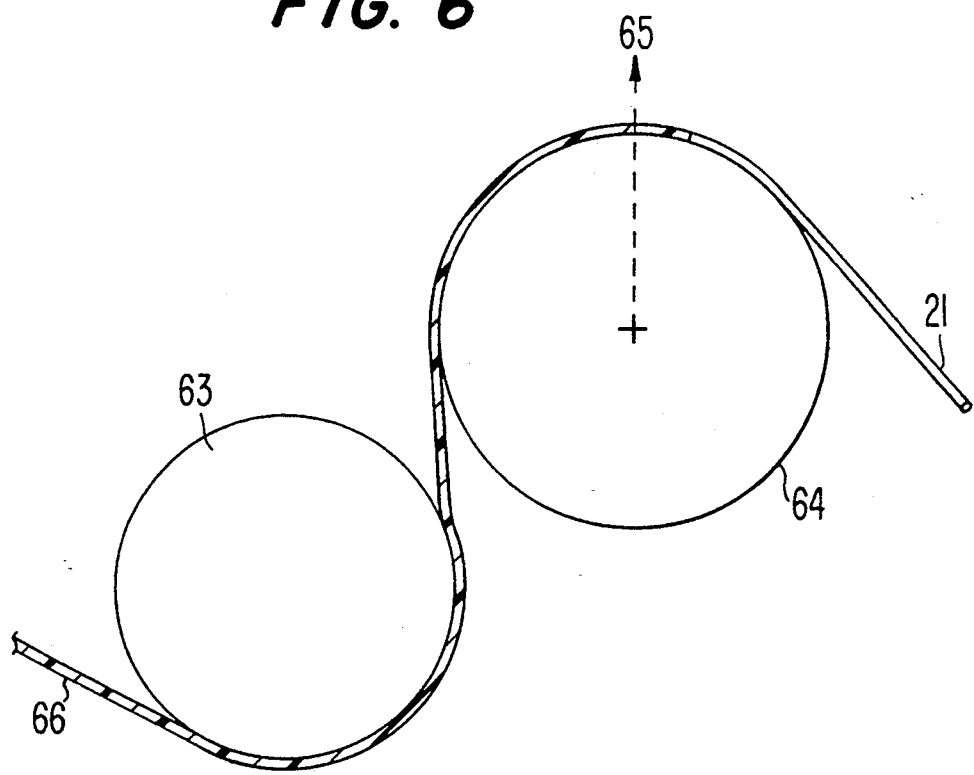
FIG. 6 depicts drums of a machine used to produce the invention in cross-sectional view.

Referring to FIG. 6, a cross section of drums of a machine used to produce the continuous PTFE fiber of the instant invention is depicted. The machine is comprised of a controlling means 63 and a driven drum 64 having an outside surface. In FIG. 6, the controlling means 63 is depicted as a drum, however, the controlling means may also include dancer arms or eyelet guides that aid in controlling the continuous PTFE sheet 66 as it contacts the outside surface of the driven drum 64.

Still referring to FIG. 6, in order to form a continuous substantially round PTFE fiber 21 of the instant invention, the continuous PTFE sheet 66 is passed around the controlling means 63 and is carefully fed onto the outside surface of the driven drum 64. The outside surface of the driven drum is conditioned in such a manner so that the continuous sheet of PTFE is tightly held against the outside surface of the driven drum. If the PTFE sheet is an expanded microporous PTFE sheet, the surface of the driven drum should be of a metal, preferably of a heated metal.

The driven drum is rotated about an axis by a drive means so that the continuous PTFE sheet is caused to move circumferentially along the outside surface of the driven drum.

Figure 7:
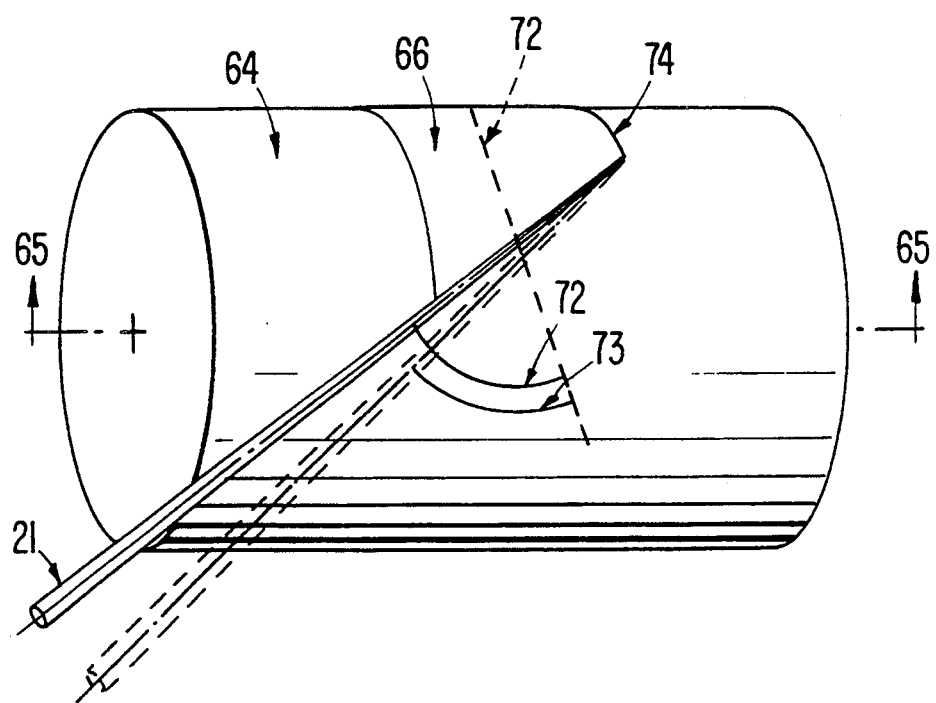
FIG. 7 is a perspective view of a driven drum in FIG. 6.

Referring to FIG. 7, a perspective view of the driven drum 64 perpendicular to orientation line 65 is depicted. While the continuous PTFE sheet 66 is maintained in contact and tightly held by the surface of the driven drum 64, an edge 74 of the continuous sheet of PTFE is removed from contact with the outside surface of the driven drum and the edge is rolled over and is caused to contact the continuous PTFE sheet that is still in contact and tightly held by the surface of the driven drum. The removed edge contacts the continuous PTFE sheet at an angle 71 to a longitudinal axis of the continuous PTFE sheet 72. The surface of the continuous PTFE sheet is conditioned in such a manner so that the removed edge adheres to the surface of the PTFE sheet tightly held to the surface of the driven drum. As the driven drum is rotated by the drive means and the continuous PTFE sheet is caused to move circumferentially along the surface of the driven drum, the removed edge adhering to the surface of the continuous PTFE sheet is thereby rolled upon itself producing a continuous PTFE fiber 21 which is removed from the outside surface of the driven drum at an angle 73 to the longitudinal axis of the continuous PTFE sheet. The angle at which the continuous PTFE fiber is removed from the driven drum is not necessarily the same angle that the removed edge of the PTFE sheet contacts the surface of the PTFE sheet since a greater angle may be necessary to cause the continuous PTFE sheet to initially helically roll than is necessary to remove the continuous round PTFE fiber from the driven drum once fiber formation has begun.

As the continuous PTFE sheet helically rolls upon itself forming the continuous PTFE fiber, wraps of the continuous PTFE sheet come in contact with one another while on the drum surface and adhere to one another thereby forming a continuous round PTFE fiber containing multiple layers of PTFE helically rolled and adhered to themselves.

Heat, applied by the driven drum surface, may be used to increase the adhesion between the multiple layers of PTFE of the continuous PTFE fiber during formation of the continuous PTFE fiber. If the continuous PTFE sheet is a sheet of expanded microporous PTFE, the driven drum may be heated to a temperature in excess of 327° C. more preferably in excess of 342° C. so that the PTFE sheet is subjected to a heat treatment amorphous locking process as taught in U.S. Pat. No. 3,953,566 to Gore, column 3, lines 49–55, incorporated herein by reference. The heat treatment amorphous locking process entails exposing the continuous sheet of expanded microporous PTFE to temperatures in excess of 327' C. thereby reducing the crystalline content of the continuous sheet of expanded microporous PTFE.

Alternatively, the continuous sheet of expanded microporous PTFE may have previously been subjected to the heat treatment amorphous locking process.. Previously subjecting the continuous sheet of expanded-microporous PTFE to the amorphous locking process reduces fraying of the PTFE sheet when producing continuous PTFE fibers having small diameters.

Alternatively, the continuous PTFE fiber may subsequently be subjected to the heat treatment amorphous locking process. The heat treatment amorphous locking process may be accomplished by placing the continuous PTFE fiber in a high temperature enclosure. The high temperature enclosure is a heating means capable of maintaining temperatures in excess of 327° C. The high temperature enclosure may be a hot air convection oven, a radiant heat oven, or a molten salt bath. If the continuous PTFE fiber is to be subsequently subjected to the heat treatment amorphous locking process, adhesion between the layers of the continuous PTFE sheet must be sufficient to allow the heat treatment amorphous locking process without unwinding of the continuous PTFE fiber.

The use of the high temperature enclosure for performing a subsequent heat treatment amorphous locking process may be particularly desirable for the efficient production of continuous PTFE fibers having large diameters.

The continuous sheet of PTFE may be filled with various particulate filler presently used to fill expanded microporous PTFE sheets as taught in U.S. Pat. No. 4,096,227 to Gore and U.S. Pat. No. 4,985,296 to Mortimer, Jr. and incorporated herein by reference. Particulate fillers may be an inorganic material selected from the class consisting of metals, semi-metals, metal oxides, glass and ceramics. Particulate fillers may be an organic material selected from the class consisting of activated carbon, carbon black and polymeric resin. If a conductive particulate filler is used to fill the continuous sheet of PTFE and is present in a sufficient amount, the continuous sheet of PTFE may be static dissipative or conductive in nature, and continuous PTFE fibers produced from these continuous sheets of PTFE may be static dissipative or conductive in nature as well.

A material is defined herein as being static dissipative if it has a volume resistivity of less than 109 and greater than 10 2 ohm cm as determined by ASTM D 257-90. A material is defined herein as being conductive if it has a volume resistivity of 10 2 ohm cm or less as determined by ASTM D 257-90.

Figure 4A:
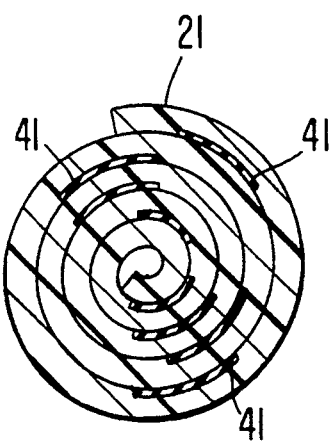
FIG. 4 depicts other embodiments of the inventive fiber in cross-sectional views.
Figure 4B:
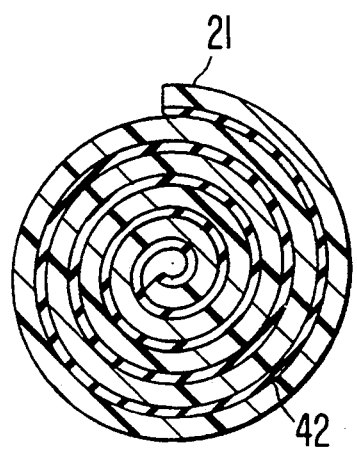

"Particulate" is defined herein to mean individual particles of any aspect ratio including fibers and powders. Referring to FIG. 4b, the continuous sheet of PTFE may be coated on one surface with a polymeric material. The continuous sheet of PTFE 21 may be coated with the polymeric material so that the entirety of the surface is covered by a coating of the polymeric material thereby forming a continuous layer of polymeric material 42. Referring to FIG. 4a, alternatively the continuous sheet of PTFE 21 may be coated with the polymeric material in a discrete pattern, such as a series of stripes or dots 41, so that portions of the continuous sheet of PTFE remain uncoated.

If the continuous sheet of PTFE is either microporous PTFE or expanded microporous PTFE, the coating of polymeric material may be penetrated into the pores of the continuous sheet of PTFE thereby effectuating a tight bond between the coating of polymeric material and the sheet of PTFE. Polymeric materials for use as the coating on the PTFE sheet must resist any subsequent processing step needed to produce the continuous fiber without excessive degradation. Polymeric materials include elastomeric polymers. Elastomeric polymers may be selected from the class consisting of natural rubber, synthetic rubbers, polyurethanes and fluoroelastomers. Elastomeric polymers must be capable of withstanding elevated temperatures used in the formation of the continuous fiber. Coating the continuous sheet of PTFE with an elastomer imparts increased resiliency to the continuous PTFE fiber formed thereof.

The polymeric materials for use as the coating on the continuous sheet of PTFE also include ion exchange resins selected from the class consisting of perfluorosulfonic acid polymer and perfluorocarboxylic acid polymer.

The diameter and density of the continuous PTFE fiber may be varied through the use of continuous sheets of PTFE having differing porosities, thicknesses and widths. The diameter and density of the continuous PTFE fiber is also determined by the tightness with which the layers of the continuous sheets of PTFE are rolled in the formation of the fiber. When the continuous sheets of PTFE are expanded microporous PTFE sheets, the diameter and density of the continuous PTFE fiber may be varied through the use of the heat treatment amorphous locking step. The heat treatment amorphous locking step causes expanded microporous PTFE sheets to contract unless restrained by a physical means from doing so. A continuous PTFE fiber of expanded microporous PTFE sheet will contract upon itself thereby tightening the rolled expanded microporous PTFE sheets upon themselves and decreasing the diameter while increasing the density of the resultant fiber.

Figure 8:
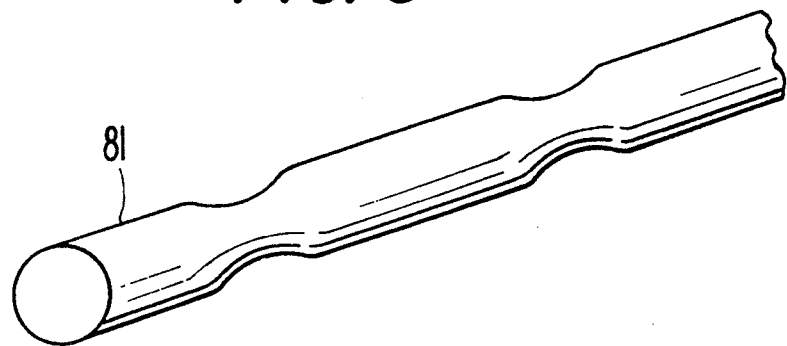
FIG. 8 depicts another embodiment of the inventive fiber in perspective view.

Referring to FIG. 8, a continuous PTFE fiber may be produced from a continuous sheet of PTFE in which the sheet contains non-parallel edges. When the sheet having non-parallel edges is rolled upon the driven drum, the resultant fiber 81 has a diameter that varies along its length.

Figure 9:
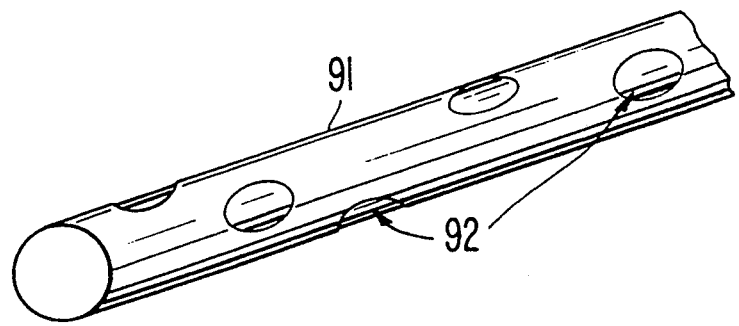
FIG. 9 depicts still another embodiment of the inventive fiber in perspective view.

Referring to FIG. 9, continuous PTFE fiber may be produced from a continuous sheet of PTFE in which discrete portions of the sheet are excised. When this sheet is rolled upon the driven drum, the resultant fiber 91 has a knobbed appearance. If those portions of the sheet in which discrete portions of material have been excised are in the outermost layer in the continuous PTFE fiber, pores or dimples 92 are formed on the outside surface of the fiber.

These pores or dimples may function as reservoirs for materials or agents subsequently added to the continuous substantially round PTFE fiber after formation and contained within the pores or dimples. Materials or agents are selected from the class consisting of antibiotics and coagulants which have utility when the inventive fiber is used in a therapeutic manner such as for example a suture.

Figure 5:
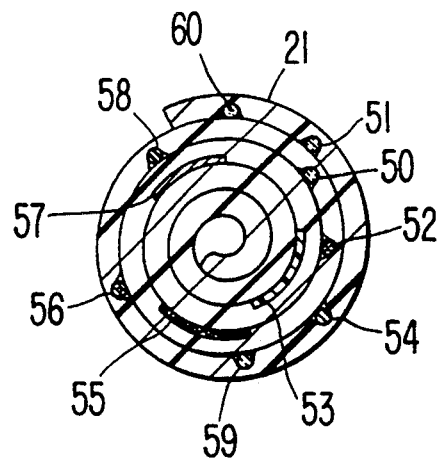
FIG. 5 depicts another embodiment of the inventive fiber in cross-sectional view.

Referring to FIG. 5, the continuous PTFE fiber 21 may contain various elements such as filamentary elements or sheet-like elements amongst the layers of the helically rolled self-adhered continuous sheet of PTFE. Filamentary elements having utility in the instant invention include transmission filamentary elements selected from the class consisting of conductive wires 54, optical fibers 51 and fine tubes 56.

Filamentary elements having utility in the instant invention also include structural filamentary elements selected from the class consisting of graphite fiber 60, aramid fiber 52, glass fiber 59 and ceramic fiber 50 for imparting high tensile strength to the round continuous PTFE fiber. Filamentary elements having utility in the instant invention also include elastomeric filamentary elements 58 selected from the class consisting of polyurethane beading, fluoroelastomer beading, natural rubber beading and synthetic rubber beading for imparting resiliency to the continuous PTFE fiber.

Still referring to FIG. 5, sheet-like elements may be placed between the layers of the PTFE sheet selected from the class consisting of polymeric films 53, metal foils 57 and metal screens 55. The sheet-like element must be sufficiently flexible to permit the sheet of PTFE to be helically wrapped to form the instant continuous PTFE fiber.

The various elements, either filamentary or sheet-like, contained within the continuous PTFE fiber may be incorporated within PTFE sheet either prior to the helical rolling step or during the helical rolling step.

If an element is to be located in or near the center of the continuous PTFE fiber, the element is placed on or near the removed edge of the continuous sheet of PTFE as the remainder of the continuous sheet of PTFE is tightly held to the surface of the heated driven metal drum. Alternately, if an element is to be located within the adhered layers of the continuous PTFE fiber, the element is placed a distance from the removed edge of the continuous sheet of PTFE as the remainder of the continuous sheet of PTFE is tightly held to the surface of the heated driven metal drum.

The following examples are intended to illustrate but not limit the present invention.

TEST METHODS

Tensile Properties

The tensile properties of the fibers are determined using the method described in ASTM D882-81. The test performed varied from the test as published with respect to the material tested. ASTM D882-81 is for testing thin plastic sheeting and not fibers. The difference is due to the dimensions of the sample. The thickness of the fibers is determined through a snap gauge. Care is taken not to crush the sample with the presser foot of the snap gauge to obtain an accurate thickness.

The samples are tested on a constant rate of grip separation machine to break. Stress at maximum load and modulus of the samples are determined.

EXAMPLES

Example 1

A continuous PTFE sheet 152.4 mm wide and 0.1 mm thick produced from fine powder PTFE resin through paste-forming techniques was obtained. This continuous PTFE sheet was passed through a bank of 152.4 mm diameter metal rollers heated to a temperature of 230° C. These heated metal rollers were driven independently from one another in such a manner so that the continuous PTFE sheet was caused to rapidly expand at a ratio of 14 to 1 and to form an expanded microporous PTFE sheet as taught in U.S. Pat. No. 4,187,390 to Gore.

The sheet of expanded microporous PTFE was removed by hand from the final heated metal roller at a speed of approximately 9.1 re/min and an angle of approximately 45° from the longitudinal axis of the sheet of expanded microporous PTFE thereby causing the sheet of expanded microporous PTFE to helically roll upon itself and produce the inventive fiber. Thermally protective gloves were worn by the operator to prevent burns from the removed fiber. Care was taken to maintain sufficient tension upon the continuous PTFE sheet so that it remained in contact with the surface of the final metal roller as the inventive fiber was removed.

The resultant fiber was continuous in length and substantially round in profile. The following physical properties were determined upon testing five samples taken from the inventive fiber.
Diameter 2.1 mm
Stress of maximum load 39,050+834 KPa
Modulus 403,700+42,510 KPa Example 2

The continuous expanded microporous PTFE sheet as produced in the first paragraph of Example 1 was subsequently fed from the bank of heated metal rollers onto a pair of 304.8 mm diameter metal drums heated to 365° C. The first of these metal drums helped to tension and to maintain the continuous expanded microporous PTFE sheet in contact with the surface of the second heated metal drum. Since the metal drums were heated in excess of 327° C., the heat treatment amorphous locking process taught in U.S. Pat. No. 3,955,566 to Gore, column 3, lines 49–55 was performed on the continuous expanded microporous PTFE sheet.

The sheet of expanded microporous PTFE was removed by hand from the second heated metal drum at a speed of approximately 9.1 re/min and an angle of approximately 45° from the longitudinal axis of the sheet of expanded microporous PTFE thereby causing the sheet of expanded microporous PTFE to helically roll upon itself and produce the inventive fiber. Thermally protective gloves were worn by the operator to prevent burns for the removed fiber. Care was taken to maintain sufficient tension upon the continuous PTFE sheet so that it remained in contact with the surface of the second heated metal drum as the inventive fiber was removed.

The resultant fiber was continuous in length and substantially round in profile. The following physical properties were determined upon testing five samples taken from the inventive fiber:
Diameter 1.3 mm
Stress at maximum load 100,400+1,300 KPa
Modulus 1,757,000±170,700 KPa Example 3

A filled PTFE sheet containing 50% by weight of a conductive carbon black powder (Ketjen black carbon available from AKZO Chemical) was obtained. The filled PTFE sheet was stretched at a 2:1 ratio, and was carefully fed onto a pair of metal drums. The first metal drum was heated to a temperature of 345° C. while the second metal drum was heated to 350° C. The metal drums were rotated as that the drums had a circumferential speed of approximately 1.1 re/min. The speed of the drums was controlled by a foot pedal by the machine operator as the operator removed the resultant fiber from the second metal drum by hand. Thermally protective gloves were worn by the operator to prevent burns from the removed fiber. The sheet was removed at an angle from the longitudinal axis of the sheet of filled PTFE thereby causing the sheet of filled PTFE to helically roll upon itself and produce the inventive fiber. Care was taken to maintain sufficient tension upon the sheet of filled PTFE so that it remained in contact with the surface of the second heated metal drum as the inventive fiber was removed.

The resultant fiber was in the form of a tube having an open lumen. The following width filled PTFE sheets produced tubes having the following outside diameters:

| Sheet Width | Outside Diameter |
| --- | --- |
| 25.4 mm | 2.5 mm |
| 20.3 mm | 2.3 mm |
| 17.1 mm | 2.0 mm |

-continued

| Sheet Width | Outside Diameter |
|---|---|
| 10.2 mm | 1.8 mm |

Example 4

A filled PTFE sheet containing 25% by weight of a conductive carbon black powder (Ketjen black carbon available from AKZO Chemical) was obtained. The filled PTFE sheet was expanded by stretching at a ratio of approximately 1.7:1.

This filled PTFE sheet was passed through a bank of 152.4 mm diameter metal rollers heated to a temperature of 230° C. These heated metal rollers were driven independently from one another in such a manner so that the filled PTFE sheet was caused to expand at various ratios to form an expanded microporous filled PTFE sheets as taught in U.S. Pat. No. 4,187,390 to Gore.

The expanded microporous filled PTFE sheets was subsequently fed onto a pair of 304.8 mm diameter metal drums. The first metal drum was heated to a temperature of 325° C. while the second metal drum was heated to 340° C. The expanded microporous filled PTFE sheet was removed from the second metal drum as in Example 3.

The resultant inventive fiber was in the form of a continuous rod. The following expansion ratios for the expanded microporous filled PTFE sheets produced continuous rods of the invention having the following diameters:

| Expansion Ratio | Diameter |
|---|---|
| 4.18:1 | 7.9 mm |
| 5.42:1 | 7.1 mm |
| 7.74:1 | 6.4 mm |
| 8.20:1 | 4.8 mm |

Example 5

A continuous expanded microporous PTFE sheet 0.23 mm wide and 0.01 mm thick expanded at a ratio of 80 to 1 and subjected to the amorphous locking process as taught in U.S. Pat. No. 3,953,566 to Gore was obtained. This continuous PTFE sheet was passed around a 304.8 mm diameter metal drum heated to a temperature of 390' C. The continuous PTFE sheet was removed from the drum at an angle of approximately 450 from the longitudinal axis of the continuous PTFE sheet by a mechanized take-up at a speed of approximately 19 re/min thereby causing the continuous sheet of PTFE to helically roll upon itself and produce the inventive fiber.

The resultant fiber was continuous in length and had a substantially round profile. The following physical properties were determined upon testing five sample taken from the inventive fiber:

Diameter 55 um
Denier (g/9000 mm) 48
Stress at maximum load 703,000±27,600 KPa
Modulus $2.2 \times 10^7 \pm 4.8 \times 10^6$ KPa

We claim:

1. A continuous fiber comprising a helically rolled self-adhered continuous sheet of polytetrafluoroethylene, said fiber having an outside surface with a substantially round profile and a single spiralling seam, said rolled self-adhered continuous sheet having a filamentary element disposed longitudinally within the rolls.

2. A continuous fiber of claim 1 wherein the filamentary element is a transmission filamentary element selected from the group consisting of conductive wires, optical fibers and tubes.

3. A continuous fiber of claim 1 wherein the filamentary element is a structural filamentary element selected from the group consisting of graphite fiber, aramid fiber and ceramic fiber.

4. A continuous fiber of claim 1 wherein the filamentary element is an elastomeric filamentary element selected from the group consisting of polyurethane beading, fluoroelastomer beading, natural rubber beading and synthetic rubber beading.

* * * * *